United States Patent [19]
Saito

[11] Patent Number: 5,806,496
[45] Date of Patent: Sep. 15, 1998

[54] FUEL INJECTED ENGINE

[75] Inventor: Chitoshi Saito, Hamamatso, Japan

[73] Assignee: Sanshin Kogyo Kabushiki Kaisha, Hamamatsu, Japan

[21] Appl. No.: 606,747

[22] Filed: Feb. 28, 1996

[30] Foreign Application Priority Data

Feb. 28, 1995 [JP] Japan .................................. 7-040411

[51] Int. Cl.⁶ .................................................. F02D 41/34
[52] U.S. Cl. .......................................................... 123/478
[58] Field of Search ........................... 60/310, 323, 313; 123/676, 478, 73 A, 443; 440/89

[56] References Cited

U.S. PATENT DOCUMENTS

| | | | |
|---|---|---|---|
| 4,768,474 | 9/1988 | Fujimoto et al. | 123/73 B |
| 5,329,907 | 7/1994 | Nonaka | 123/478 |
| 5,346,417 | 9/1994 | Isogawa | 440/89 |
| 5,387,163 | 2/1995 | Sakamoto et al. | 477/100 |
| 5,450,830 | 9/1995 | Katoh | 123/443 |

*Primary Examiner*—Tony M. Argenbright
*Assistant Examiner*—Hieu T. Vo
*Attorney, Agent, or Firm*—Knobbe Martens Olson & Bear, LLP

[57] ABSTRACT

A fuel injected engine accounts for differences in intake and exhaust path lengths between cylinders of a cylinder bank by adjusting the amount of fuel delivered to each cylinder depending upon the position of the cylinder within the bank and upon the operational condition of the engine. At low load conditions, an electronic control unit of the engine instructs the fuel injectors to inject more fuel into an upper cylinder than into a lower cylinder within the same cylinder bank. At higher load conditions, however, the fuel injectors inject equal amounts of fuel into all cylinders of the cylinder bank. The amount of fuel delivered for a given load condition desirably minimizes hydrocarbon emissions and maximizes produced torque. The engine also includes a muffler with dedicated expansion chambers for each cylinder bank. This arrangement isolates the exhaust systems associated with each cylinder bank from each other. As a result, expansion waves produced in the exhaust system of one cylinder bank generally do not interfere with or cancel out tuned wave propagation in the exhaust system of the other cylinder bank.

17 Claims, 7 Drawing Sheets

FUEL INJECTED ENGINE

BACKGROUND OF THE INVENTION

1. Field of the Invention

The present invention generally relates to a marine engine. In particular, the present invention relates to a two-cycle, crankcase compression engine having direct cylinder injection.

2. Description of Related Art

An outboard motor commonly includes an engine arranged with its output shaft rotating about a vertical axis. This orientation requires that the axes of the cylinders of the engine lie generally horizontal and parallel to one another within a common vertical plane. With this arrangement, the intake paths and the exhaust paths commonly vary in length between the cylinder.

Variations in the lengths of the intake paths and the exhaust paths also occur between the cylinder banks of a V-type engine. In V-type engines, the cylinder banks extend at an angle relative to each other. The cylinder bores of the first cylinder bank in a V-type engine typically are offset slightly in the vertical direction from the adjacent cylinder bores of the second cylinder bank so that the connecting rods of adjacent cylinders can be journaled on the same throw of the crankshaft. This offset commonly produces different intake path lengths and different exhaust path lengths between the cylinder banks.

Despite the differences in intake and exhaust path lengths between the cylinders of a cylinder bank and between the cylinder banks of the engine, most electronic control units (ECUs) sense intake air through a common intake manifold and use the sensed air flow amount to determine the specific fuel amount to be injected into each cylinder. The ECU calculates the specific fuel amount required to be injected into each cylinder in order to obtain a desired fuel/air ratio. With this calculation completed, the ECU instructs the fuel injectors to inject the same amount of fuel into each cylinder within the cylinder bank. The ECU also instructs the fuel injectors of the cylinder banks to inject the same amount of fuel into adjacent cylinders of the cylinder banks (e.g., to inject the same amount of fuel into the upper cylinder of each bank).

SUMMARY OF THE INVENTION

The present invention includes the recognition that the intake amount of air into each cylinder in a cylinder bank is not necessarily the same if differences in intake and exhaust path lengths exist between the cylinders of the bank. Likewise, the intake amount of air into adjacent cylinders on opposite banks also may differ if the intake and exhaust path lengths are not identical between the cylinders. As a result, the air/fuel mixtures between cylinders can differ where the fuel amount is based on the sensed intake air amount detected in the common intake manifold. Variations of the richness of the fuel charge between the cylinders consequently causes inconsistent engine rotation, increased hydrocarbon emissions, and reduced torque performance, especially when the engine operates under a low load condition.

A need therefore exists for a fuel injected engine which accounts for variations of intake and exhaust lengths between cylinders by adjusting the fuel amounts delivered to the cylinders depending upon the position of the respective cylinder within the engine.

One aspect of the present invention involves an internal combustion engine including first and second variable-volume combustion chambers. Each combustion chamber is defined by a pair of components which move relative to each other. First and second fuel injectors deliver a fuel charge to a respective one of the combustion chambers and first and second exhaust conduits communicate with a respective one of the combustion chambers. The first exhaust conduit has a longer length than the second exhaust conduit. A controller determines the load condition on the engine and operates the fuel injectors to inject more fuel into the first combustion chamber than into the second combustion chamber with the engine operating at less than a preselected load operational state.

In accordance with another aspect of the present invention, a marine outboard drive is provided including an internal combustion engine. The engine has at least first and second cylinder banks with each cylinder bank including a plurality of cylinders. The cylinders of the first cylinder bank communicate with a first exhaust manifold and the cylinders of the second cylinder bank communicate with a second exhaust manifold. A muffler comprises first and second expansion chambers. The chambers generally have the same volumetric size. The first exhaust manifold communicates with the first expansion chamber and the second exhaust manifold communicates with the second expansion chamber.

A preferred method of operating a fuel injected internal combustion engine involves sensing the load condition on the engine, and delivering differing amounts of fuel to the cylinders of a cylinder bank when the engine operates at a load operational condition less than a preselected load operational condition.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
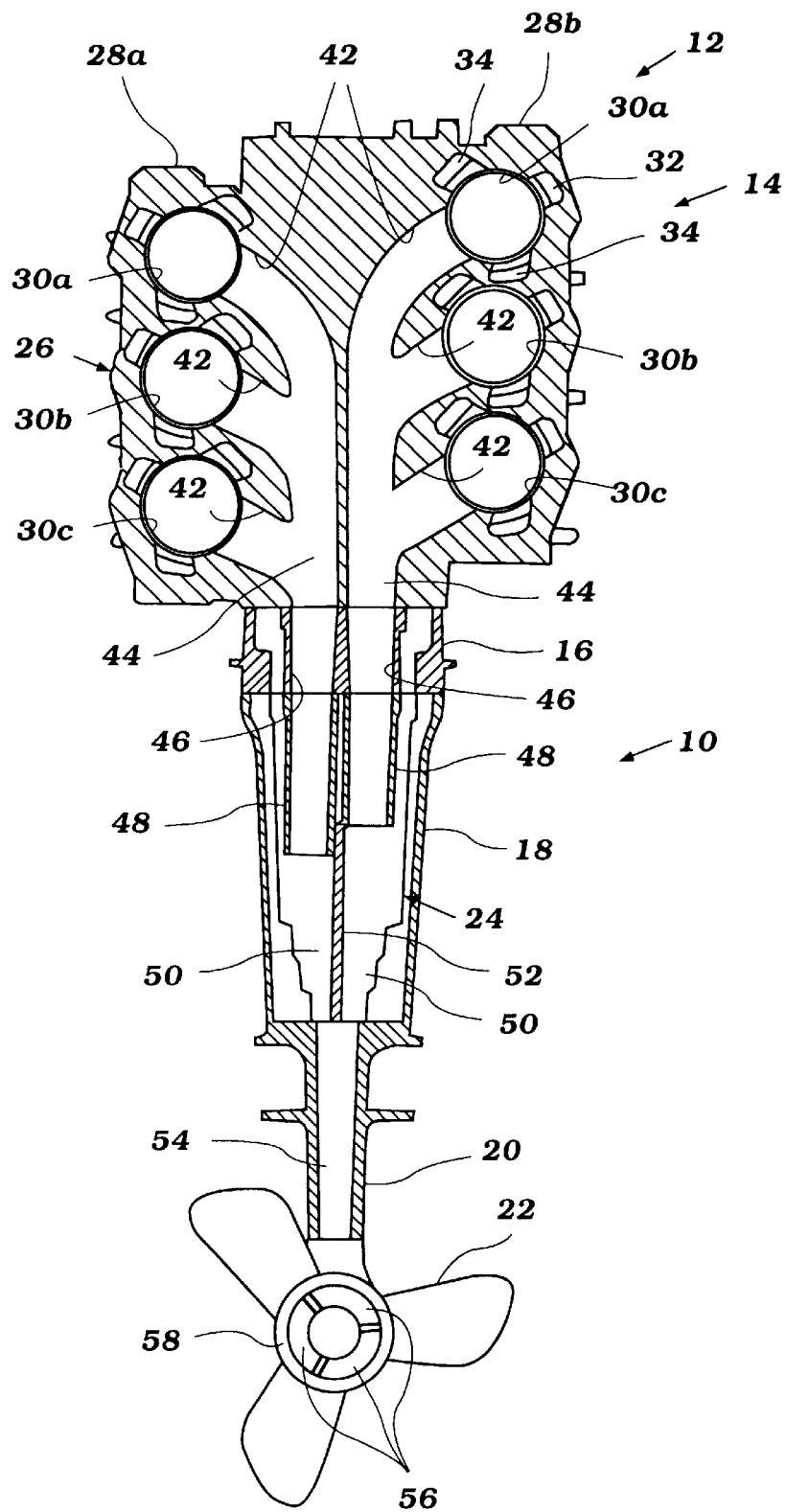
FIG. 1 is a rear elevational cross-sectional view of a marine drive incorporating an engine configured in accordance with a preferred embodiment of the present invention.

FIG. 1 illustrates a marine drive 10 of the type in which the present fuel injection system can be incorporated. The present fuel injection system has particular utility with marine drives employing two-cycle, crankcase compression, V-type internal combustion engines as the power unit. Because outboard motors commonly employ such engines, the fuel injection system is being described in connection with an outboard motor; however, the depiction of the invention in conjunction with an outboard motor is merely exemplary. Those skilled in the art will readily appreciate that the present fuel injection system can be applied to an inboard motor of an inboard/outboard drive, to an inboard motor of a personal watercraft, and to other types of watercraft engines as well.

In the illustrated embodiment, the outboard drive 10 includes a power head 12 formed in part by an engine 14. A conventional cowling (not shown) desirably surrounds the engine 14, as known in the art.

The engine 14 is mounted to a support plate 16. The orientation of the engine 14 on the support plate 16 positions a crankshaft 17 (FIG. 5) to rotate about a generally vertical axis. The crankshaft 17 drives a drive shaft (not shown) which depends from the power head 12 of the outboard drive 10 and extends through and is journaled within a drive shaft housing 18. The drive shaft depends downwardly into a lower unit 20 where it drives a transmission (not shown).

The transmission is configured to selectively establish a drive condition of a propulsion device 22, such as, for example, a propeller. The transmission desirably is a forward/neutral/reverse type transmission. In this manner, the propulsion device 22 can drive the watercraft in any of these operational states.

As seen in FIG. 1, the drive shaft housing 18 extends downwardly from the support plate 16 and terminates in the lower unit 22. The drive shaft housing 18 houses a muffler 24 that communicate with an exhaust system of the engine 14, as described below.

Figure 2:
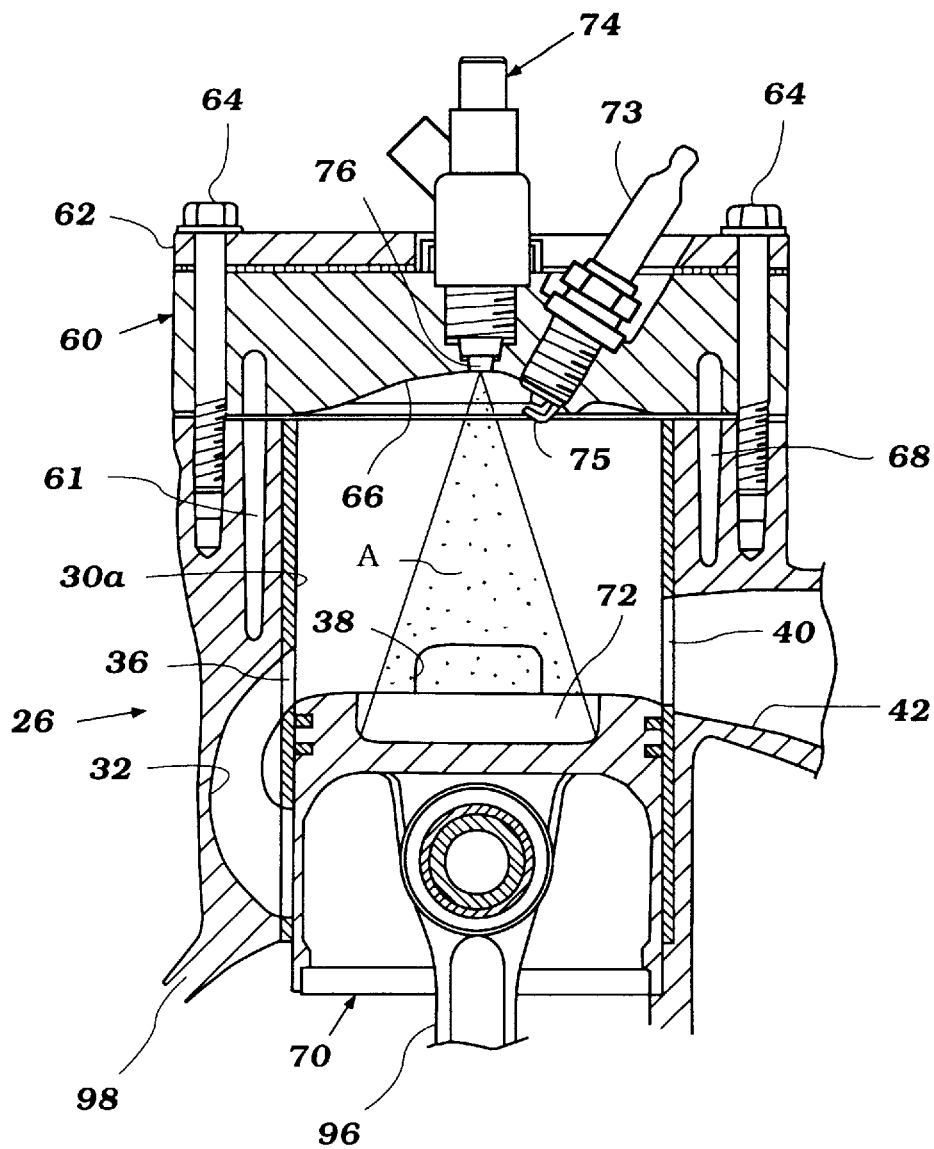
FIG. 2 is a partial, plan cross-sectional view of a cylinder assembly of the engine of FIG. 1.
Figure 3:
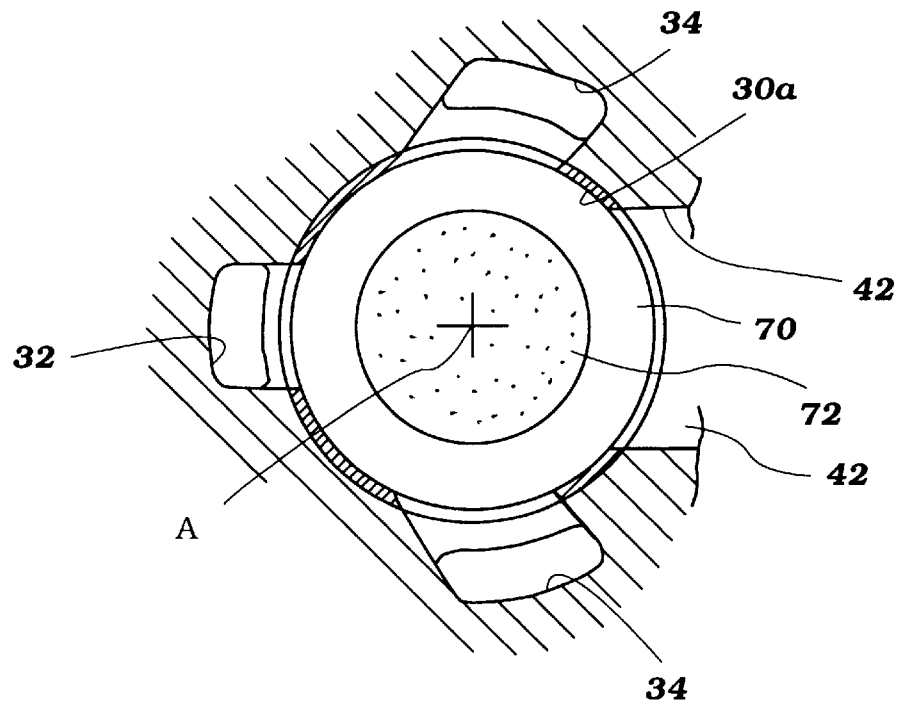
FIG. 3 is a cross-sectional view of the cylinder assembly taken along line 3—3 of FIG. 2.

With reference to FIGS. 1 through 3, the engine 14 desirably is a reciprocating multi-cylinder engine operating on a two-cycle, crankcase compression principle. In the illustrated embodiment, the engine 14 has a V-type configuration, and specifically a V-6 cylinder arrangement. The present invention, however, may be applicable to engines having other cylinder numbers and other cylinder arrangements, such as, for example, in-line or slant cylinder arrangements.

A cylinder block assembly 26 lies generally at the center of the engine 14. In the illustrated embodiment, the cylinder block 26 includes a pair of inclined cylinder banks 28a, 28b (commonly designated by reference numeral 28). The cylinder banks 28 extend at an angle relative to each other to give the engine 14 a conventional V-type configuration.

Each cylinder bank 28 includes a plurality of parallel cylinder bores. A cylinder liner, generally designated by reference numeral 30, forms each cylinder bore. The cylinder liner 30 is cast or pressed in place in the cylinder bank 28 in a known manner. In the illustrated embodiment, as seen in FIG. 1, each cylinder bank 28 includes an upper cylinder 30a, a middle cylinder 30b and a lower cylinder 30c. As is typical with V-engine arrangements, the cylinder bores 30 of the first cylinder bank 28 are offset slightly in the vertical direction from the cylinder bores 30 of the second cylinder bank 28 so that the connecting rods of adjacent cylinders 30 can be journaled on the same throw of the crankshaft 17, as known in the art.

As understood from FIGS. 1 through 3, each cylinder 30 includes a plurality of scavenge passages formed in the cylinder block 26. In the illustrated embodiment, each cylinder 30 includes a main scavenge passage 32 and a pair of circumferentially disposed side scavenge passages 34. The scavenge passages 32, 34 terminate in respective scavenge ports 36, 38 formed in the cylinder liner 30.

An exhaust port 40 lies diametrically opposite of the main scavenge port 36 and between the side scavenge ports 38. The exhaust port 40 is also formed in the cylinder liner 30. An exhaust passage 42 communicates with the cylinder 30 through the exhaust port 40. The configuration of the ports desirably is designed to provide a Schnurle-type scavenging in the cylinder 30.

With reference to FIG. 1, the exhaust passages 42 associated with the cylinders 30 of each cylinder bank 28 lead away from the respective cylinder 30 and merge into a common exhaust manifold 44. Each exhaust manifold 44 communicates with an exhaust conduit 46 formed in the mounting plate 16. An exhaust pipe 48 communicates with each exhaust conduit 46. Each exhaust pipe 48 depends from the bottom side of the support plate 16 down into the drive shaft housing 18.

The length of the exhaust passages 42 and the combined length of the respective exhaust manifold 44, exhaust conduit 46, and exhaust pipe 48 are desirably tuned to produce reflected expansion waves which return to the exhaust port 40 at the time the respective exhaust port 40 is closing. The reflected expansion waves help scavenge the combustion products (i.e., supercharge), as known in the art.

In the illustrated embodiment, one of the exhaust pipes 48 has a longer length than the other because the respective exhaust manifold 46 has a shorter length. The difference in manifold length is due to the slight vertical offset between the cylinders 30 of one bank 28 and the cylinders 30 of the other bank 28, as described above.

The exhaust pipes 48 form part of the muffler 24 disposed within the drive shaft housing 18. Each exhaust pipe 48 opens into a dedicated expansion chamber 50 which receives exhaust gases from the cylinders 30 of only one of the cylinder banks 28. This arrangement generally prevents the expansion waves produced in the exhaust system of one cylinder bank 28 from interfering with or canceling out the tuned wave propagation in the exhaust system of the other cylinder bank 28.

In the illustrated embodiment, a central wall 52 bifurcates the muffler 24 to form the expansion chambers 50. The expansion chambers 50 generally have the same size and shape.

Each expansion chamber 50 communicates with a common exhaust discharge conduit 54 formed in the lower unit 20. The exhaust conduit 54 delivers exhaust gases from the muffler 24 to exhaust passages 56 formed in a hub 58 of the propeller 22. In this manner, engine exhaust is discharged to a submerged region of reduced water pressure behind the propeller 24 to facilitate exhaust flow through the muffler 24, the exhaust discharge conduit 54, and the exhaust passages 56, as known in the art.

With reference to FIG. 2, a cylinder head assembly 60 including a cover 62 is affixed to each of the cylinder banks 28 by a plurality of fasteners 64 (e.g., bolts). Each cylinder head assembly 60 includes a plurality of recesses 66. One of the recesses 66 cooperates with each cylinder bores 30 to close an end of the cylinder. The cylinder head assembly 60 and the cylinder block assembly 26 also define a plurality of water jacket passages 68 which encircle the upper end of the cylinder 30.

A piston 70 reciprocates within each cylinder bore 30. The piston 70 includes a recess 72 formed in the head of the piston 70. As understood from FIGS. 2 and 3, the recess 72 has a generally cylindrical bore configuration concentrically positioned about the center of the piston 70. The head of the piston 70 including the recess 72, the cylinder bore 30, and the recess 66 in the cylinder head assembly 60 together define a variable volume chamber which, at minimum volume, defines the combustion chamber.

Spark plugs 73 are mounted in the cylinder head assemblies 60 and are fired by a suitable ignition system (not shown). A spark gap 75 of each spark plug 73 is positioned to lie generally in the corresponding recess 66 of the cylinder head assembly 60.

Each cylinder head assembly 60 also supports a plurality of fuel injectors 74 which correspond to a respective cylinder bore 30. Each fuel injector 74 is positioned at the center of the corresponding cylinder 30 with a spray nozzle 76 positioned at the upper surface of the recess 66 formed in the cylinder head assembly 60. In this position, the fuel injector 74 substantially aligns with the axis of the cylinder bore 30 and injects fuel toward the recess 72 formed in the piston head 70.

The fuel injector 74 receives pressurized fuel from a fuel manifold (not shown). A conventional fuel delivery system supplies fuel to the fuel manifold in a known manner.

Figure 4:
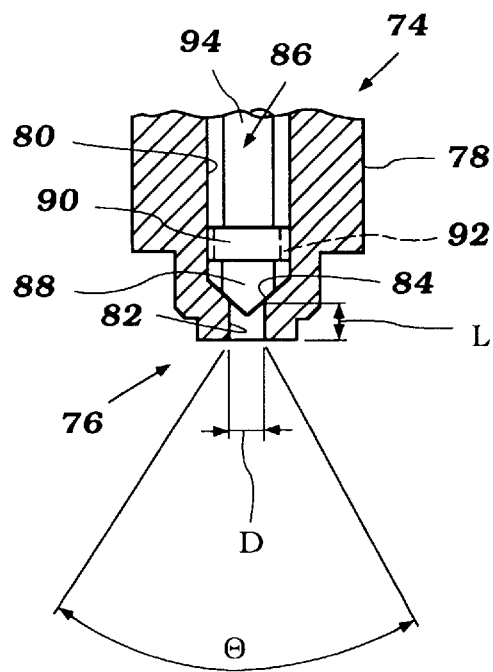
FIG. 4 is an enlarged, partial cross-sectional view of a fuel injector of the cylinder assembly of FIG. 2.

With reference to FIG. 4, each fuel injector 74 includes an injector body 78 which defines a central bore 80. The bore 80 extends along the longitudinal axis of the injector body 78. Fuel is delivered to the interior of the bore 80 through a fuel inlet (not shown) which cooperates with the fuel manifold. The bore 80 opens into a nozzle port 82 of the injector 74. An inclined surface 84 forms a transition from the larger diameter bore 80 to the smaller diameter nozzle port 82, and acts as a valve seat, as described below.

The nozzle port 82 has a diameter D and extends for a length L. The diameter D and the length L are selected so as to provide a spray angle θ which ensures that a large portion (at least 50 percent) of fuel which is injected by the injector 74 at low speed, low load conditions, will impinge upon the recess 72 formed in the piston head 70. The shape ratio L/D of the nozzle port 82 advantageously is small so as to produce a sufficient spray angle θ to produce a spray pattern which substantially covers the recessed portion 72 of the piston 70 before the piston 70 closes the exhaust port 40. FIGS. 2 and 3 schematically illustrate an exemplary spray pattern A with the piston 70 at a position before closing the exhaust port 40. This ensures that maximum fuel can be injected under high speed, high load conditions, while at the same time the fuel particle size at low speed, low load conditions will be relatively small to ensure good fuel vaporization.

An injector valve 86 operates within the bore 80. The injector valve 86 includes a valve head 88 which mates against the valve seat formed by the inclined surface 84 positioned about the inlet to the nozzle port 82. The injector valve 86 also includes a guide 90 which has a diameter substantially matching that of the diameter of the bore 80. The guide 90 ensure proper alignment between the injector valve 86 and the bore 80 of the injector body 78. The guide 90 include a plurality of apertures 92 which extend through the guide 90 in the direction of fuel flow through the injector bore 80. The apertures 92 thus allow fuel flow through the guide 90 and toward the nozzle port 82.

A valve stem 94 extends upwardly from the valve head 88 and cooperates with a solenoid winding (not shown). When energized, the winding draws the injector valve 86 away from the valve seat 84 to open the nozzle port 82. A compression spring (not shown) is compressed through this action. When de-energized, the compression spring forces the valve head 88 against the valve seat 84 to close the nozzle port 82.

As understood from FIG. 2, a connecting rod 96 links the piston 70 to the crankshaft 17 so that reciprocal linear movement of the piston 70 rotates the crankshaft 17 in a known manner. The crankshaft 17 (FIG. 5) desirably is journaled for rotation in a crankcase. The crankshaft 17 includes a plurality of spaced rod journals which lie off axis from the crankshaft axis. An end of one of the connecting rods 96 is coupled to the rod journal so as to link the corresponding piston 70 to the crankshaft 17 in a known manner.

Figure 5:
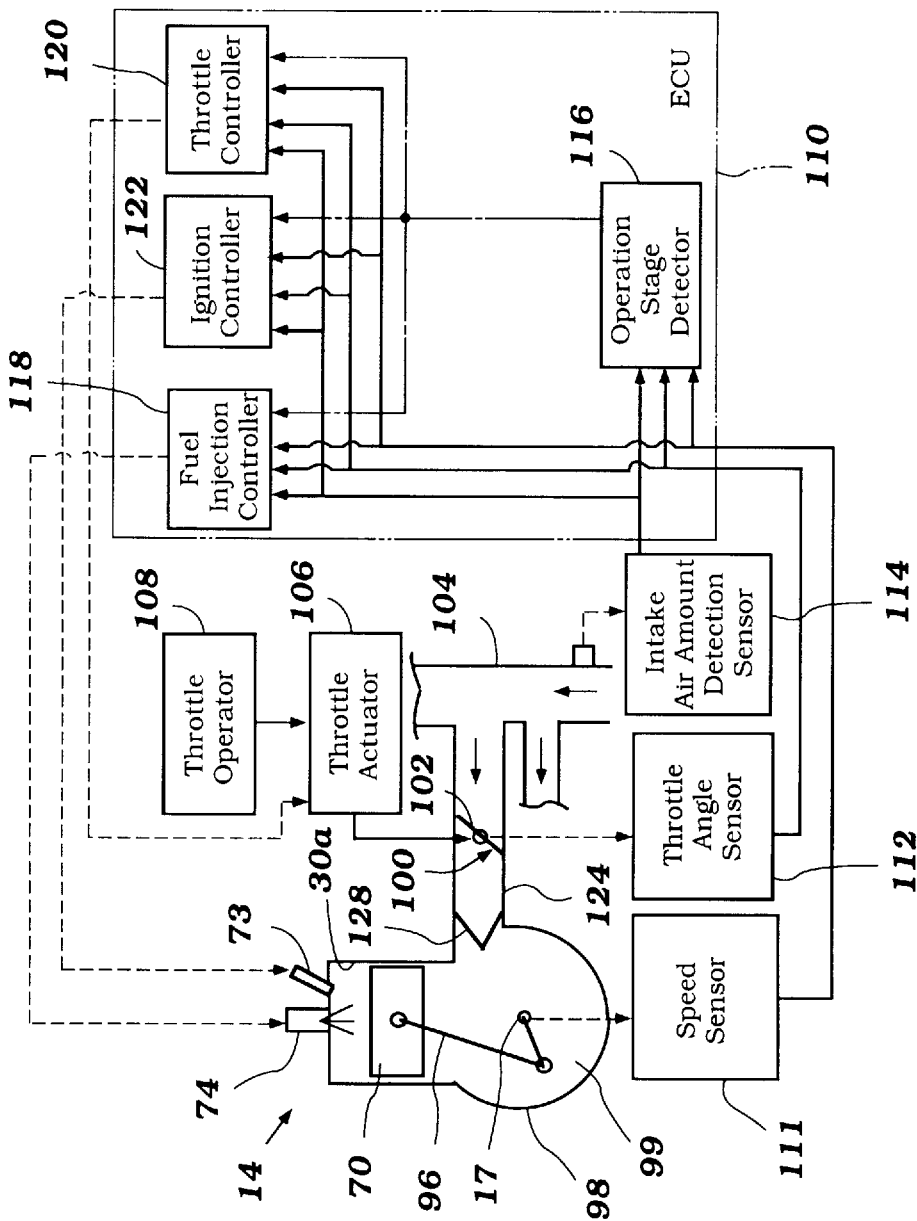
FIG. 5 is a schematic illustration a fuel injection control system shown with reference to one of the cylinder of the engine of FIG. 1.

As seen in FIGS. 2 and 5, a skirt 98 of the cylinder block assembly 26 and a crankcase member (not shown) cooperate to form the crankcase. The crankcase is divided into a plurality of chambers 99, with each chamber communicating with a respective cylinder bore through the corresponding scavenge passages 32, 34. Adjacent crankcase chambers 99 are sealed from each other.

FIG. 5 schematically illustrates an induction system which communicates with each crankcase chamber 99. In the illustrated embodiment, the induction system includes a plurality of throttle devices 100 to control the air flow into the engine 14. The throttle devices 100 desirably correspond in number to the number of crankcase chambers 99. Each throttle device 100 is dedicated to control air flow in a respective crankcase chamber 99.

The throttle devices 100 can, for example, be throttle valve assemblies; however, other conventional throttle devices can be used to regulate air flow into the crankcase chambers 99. Each throttle assembly 100 includes a throttle body which houses a throttle valve 102. A throttle shaft supports the valve 102 within the throttle body.

Each throttle valve body communicates with an intake air manifold or plenum chamber 104 of the induction system. Inlet air flows through the intake manifold 104 and passes through each throttle device 100 when the throttle shaft is rotated to open the throttle valve 102. A throttle linkage (not shown) desirably connects the throttle shafts together so as to uniformly and simultaneously operate and control the throttle valves 102 in a known manner.

As understood from FIG. 5, a throttle actuator 106 actuates the throttle linkage to change the opening degree of the throttle devices 100. The throttle actuator 106 cooperates with a throttle operator 108 as well as an electrical control unit (ECU) 110 of the engine 14 as described below.

The throttle operator 108 in the illustrated embodiment acts as an operator control mechanism to establish a desired operating condition of the engine 14. The throttle operator 108 can be part of a conventional remote control unit positioned at a remote location in the watercraft. The operator 108 can be pivotally moved relative to a housing of the remote control unit. Movement of the operator 108 generally controls the operation of the throttle actuator and establishes a desired operating condition of the engine 14. Movement of the throttle operator 108 in one direction relative to the housing opens the throttle devices 100, and movement in the opposite direction closes the throttle devices 100.

A conventional bowden wire or fly-by wire (not shown) can be used to communicate throttle operator movement to the throttle actuator 106. A lost motion connection (not shown) desirably lies between the throttle operator 108 and the throttle actuator 106 such that movement of the throttle operator 108 within a particular range of movement corresponding to low speed, low load conditions on the engine 14 does not cause the throttle actuator 106 to actuate the throttle linkage.

As seen in FIG. 5, the ECU communicates with a sensory system which detects engine speed as well as intake air flow. In the illustrated embodiment, the sensory system includes a speed sensor 111 which measures engine speed and generates an input signal indicative of the speed. A throttle angle detector sensor 112 detects the opening degree of the throttle device 100 (e.g., the angular orientation of the throttle valve 102) and generates an input signal indicative of the throttle opening degree. An intake air amount detection sensor 114 senses the amount of air flowing through the intake manifold 104. Any of a wide variety of intake air flow sensors can be used, such as, for example, a pivot vane-type sensor or a high wire chronometer. The intake air amount detector sensor 114 generates an input signal which is indicative to the amount of air flow flowing through the intake manifold 104.

The ECU 110 communicates with the sensors 111, 112, 114, and receives input signals from them. As schematically illustrated in FIG. 5, the ECU includes an operation stage detector 116 which receives the input signals from the sensors. The operation stage detector 116 is configured to determine the operational condition of the engine 14 and generates an output signal indicative of the particular operational condition. The operation stage detector 116 also determines if the present operational state of the engine 14 lies below a preselected low speed, low load condition of the engine 14.

A fuel injection controller 118 of the ECU 110 receives the output signal from the operation stage detector 116 as well as the input signals from the sensors. In response to these signals, the fuel injection controller 118 generates an appropriate output signal to control the fuel injection amount and the fuel injection timing of the fuel injectors 74 in the manner described below.

A throttle controller 120 of the ECU 110 also receives the output signal from the operation stage detector 116 as well as the input signals from the sensors. Based on the input information, the throttle controller 120 controls the opening degree of the throttle device 100. The throttle controller 120 produces an output signal which is received by the throttle actuator 106. In an illustrated embodiment, the throttle controller 120 controls the throttle angle, as described below in more detail.

The ECU 110 also includes an ignition controller 122 which likewise receives the output signal from the operation stage detector 116 as well as the input signals from the sensors. The ignition controller 122 controls ignition timing and produces an output signal received by the ignition system which causes the spark plugs 73 to fire in a known manner.

The operation of the present fuel injection system will now be described with principal reference to FIGS. 5–8. Because it is believed that those skilled in the art can readily understand how the invention can be practiced with multiple cylinder engines, the operation of the engine will be initially described by particular reference to only a single cylinder, and later in reference to a single cylinder bank 28.

With reference to FIG. 5, intake air flows through the manifold 104 into the throttle body corresponding to the respective cylinder 30a. The throttle valve 100 regulates air flow into the crankcase chamber 99 associated with the respective cylinder 30a. An intake passage 124 delivers the air to the respective crankcase chamber 99 through a reed-type check valve 128 connected to the intake passage 124. The reed-type check valve 128 permits air flow into the crankcase chamber 99 when the corresponding piston 70 moves toward top dead center (TDC), but precludes reverse flow when the piston 70 moves toward bottom dead center (BDC) to compress the air delivered into the crankcase chamber 99.

Movement of the piston 70 toward bottom dead center (BDC) compresses the air in the respective crankcase chamber 99. The compressed air flows into the variable volume chamber through the plurality of scavenge passages 32, 34 as the piston 70 moves toward the bottom of its stroke. The air enters the chamber through the respective scavenge ports 36, 38. The piston 70 compresses the air within the chamber as it moves toward top dead center. During this period the fuel injector 74 injects a desired amount of fuel to form an air-fuel charge of a specific air-fuel ratio before the piston 70 closes the exhaust port 40, as described below. The charge in the combustion chamber is fired by the spark plug 73 at a desired time during the cycle. The spent charge is then discharged through the exhaust port 40 and passage 42. The exhaust gases then flow through the respective exhaust manifold 44, exhaust pipe 48, and into the corresponding expansion chamber 50 of the muffler 26. The exhaust system then discharges the burned gases in the manner described above.

In each cylinder bank 28, the amount of intake air between each cylinder 30 of the bank 28 is not necessarily the same and often varies, especially under low speed, low load operational conditions. The upper cylinder 30a tends to intake more fresh air from the induction system than the lower cylinder 30c because of the differences in lengths of the induction and exhaust paths. In order to maintain a generally constant air/fuel mixture between the cylinders 30 in the cylinder bank 28, the present fuel injection system supplies more fuel to the upper cylinder 30a than to the lower cylinder 30c with the engine operating under a low load condition.

Figures 6A, 6B:
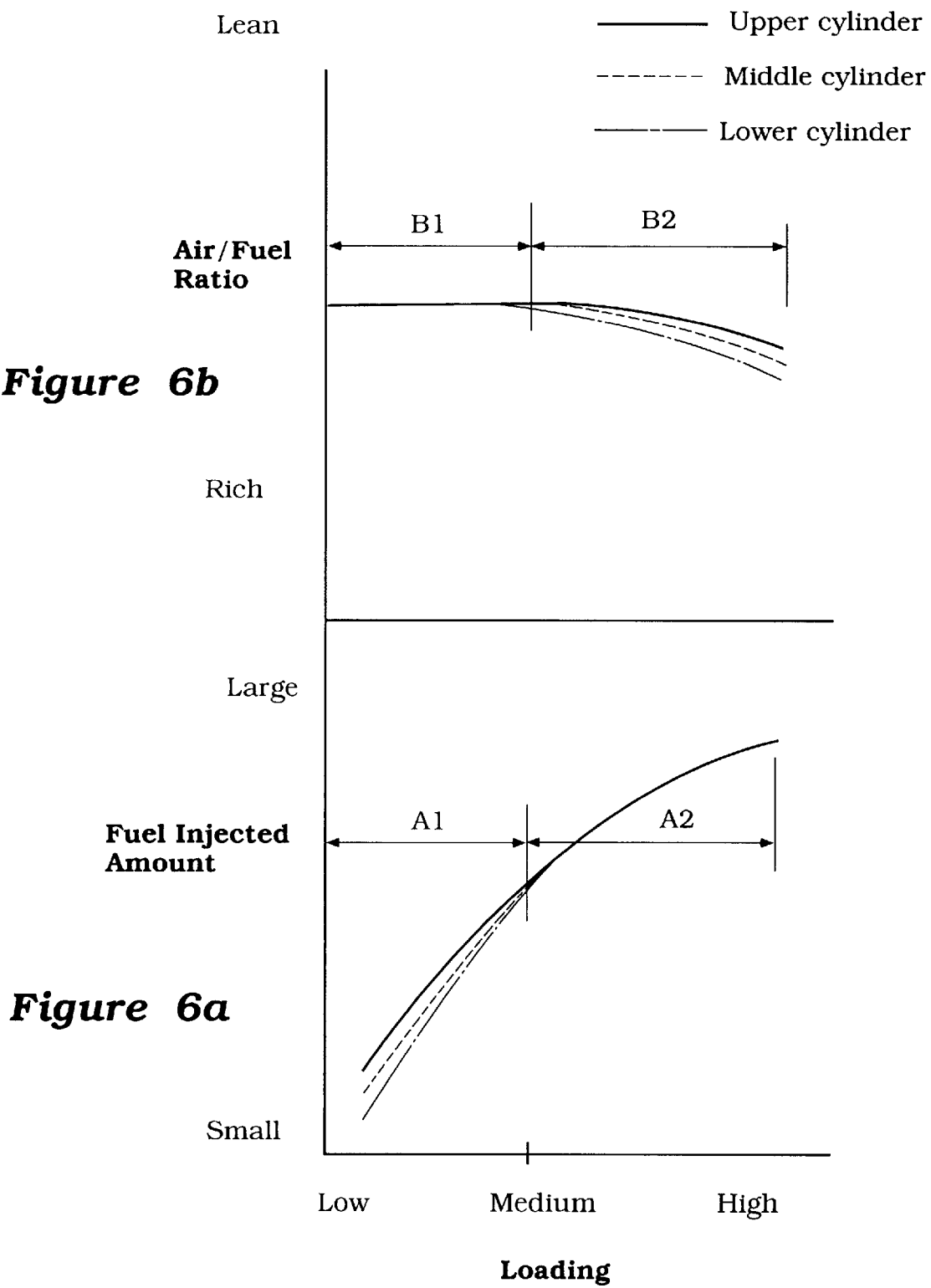
FIG. 6a is a graph of injected fuel amount versus engine load for the upper, middle and lower cylinders for one cylinder bank of the engine of FIG. 1.
FIG. 6b is a graph of air/fuel ratio versus engine load for the upper, middle and lower cylinders of one cylinder bank of the engine of FIG. 1.

For this purpose, the ECU 110 controls the amount of fuel injected into each combustion chamber depending upon the sensed operating condition of the engine 14 and depending upon the location of the cylinder 30 within the bank 28. The fuel injection controller 118 of the ECU 110 outputs a signal which instructs the respective fuel injector 74 to open for a specific period of time in order to inject a specific amount of fuel for a particular engine speed/load condition. The amount of fuel injected desirably is in accordance with a preselected fuel amount profile stored in memory in the ECU 110. FIG. 6a illustrates an exemplary profile of the amount of fuel injected versus engine speed.

As understood from FIG. 6a, the fuel injection controller 118 instructs the fuel injector 74 of the upper cylinder 30a to inject more fuel into the upper cylinder 30a than is injected into the middle or lower cylinders 30b, 30c for a given engine load condition when the engine is operating under a low to medium operating condition (i.e., operating within range A1 in FIG. 6a) Under a higher load operational condition (i.e., operation within range A2 in FIG. 6a), however, the fuel injection controller 118 instructs each of the fuel injectors 74 of the cylinder bank 28 to inject equal amounts of fuel into the cylinders 30.

As a result, as seen in FIG. 6b, the air/fuel ratio of the air/fuel charge in each cylinder 30 is substantially the same between the cylinders 30 with the engine 14 operating under a low to medium load condition (i.e., within range B1). Engine performance consequently improves under lower loading conditions. At higher loading condition (within range B2), the cylinders 30 are less sensitive to moderate variations in air/fuel ratio between the cylinders and the same amount of fuel can be delivered to each of the cylinders 30.

Figure 7A:
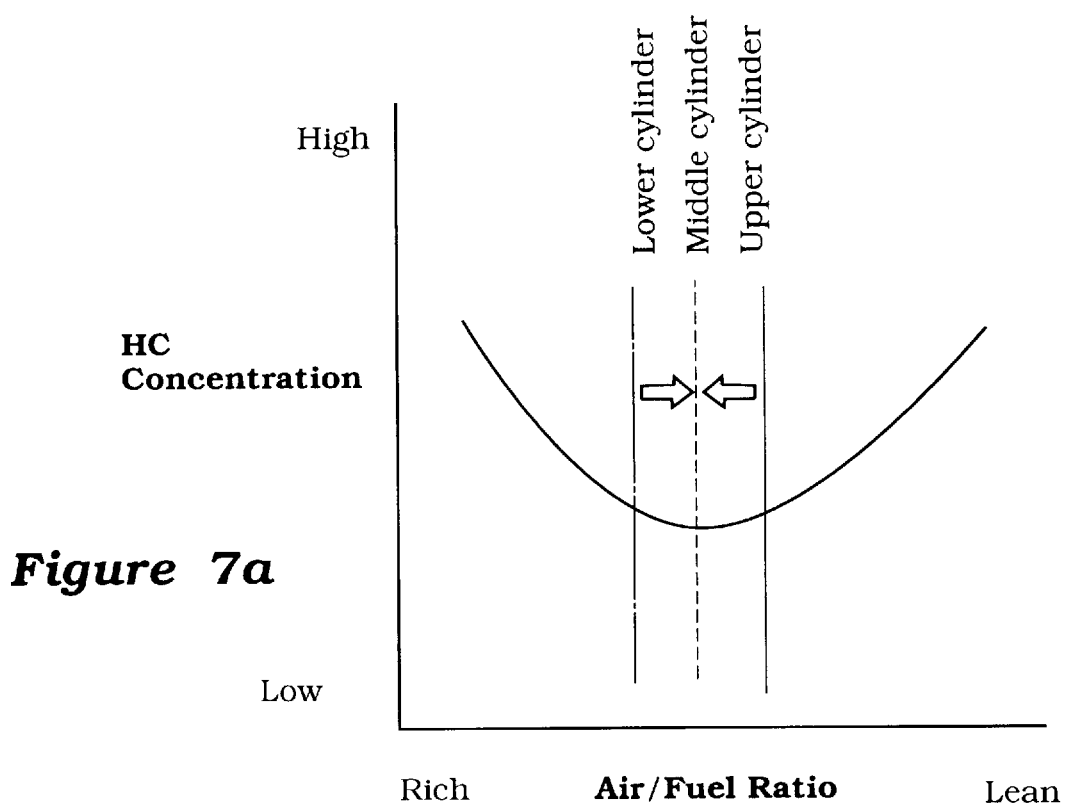
FIG. 7a is a graph of exhaust hydrocarbon concentration versus air/fuel ratio for the upper, middle and lower cylinders of one cylinder bank of the engine of FIG. 1.

As seen in FIG. 7a, the desired air fuel ratio for a given loading condition on the engine 14 above the preselected load condition (i.e., within range B2 of FIG. 6b) desirably is selected to minimize the volumetric percentage of hydrocarbons exhausted from each cylinder 30 of the cylinder bank 28. FIG. 7a illustrates a plot of hydrocarbon emission versus air/fuel ratio. The parabolic shape of the plot indicates that for the given loading condition, a specific air/fuel ratio will minimize hydrocarbon emissions. By supplying the optimal air/fuel mixture to the middle cylinder 30b and supplying a slight richer air/fuel mixture to the upper cylinder 30a and a slightly leaner air/fuel mixture to the lower cylinder 30c, hydrocarbon emissions from the cylinder bank 28 are minimized while incorporating the advantages associated with supplying the upper cylinder 30a with a leaner charger than the lower cylinder 30c.

Figure 7B:
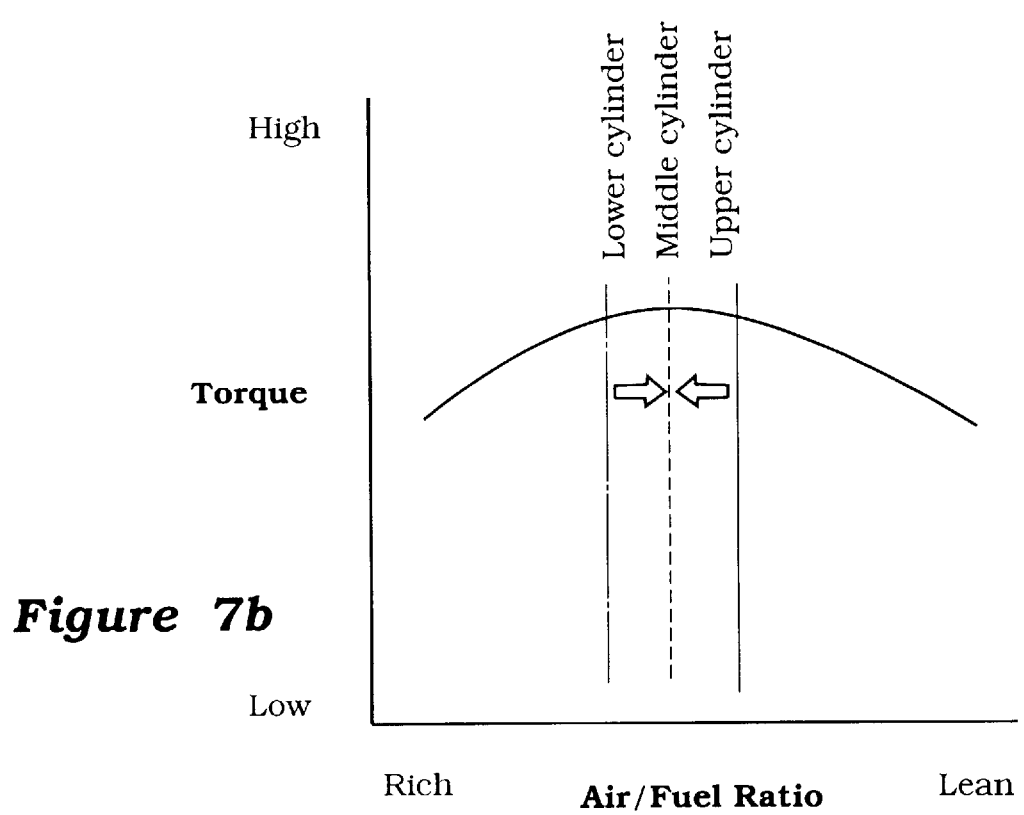
FIG. 7b is a graph of torque versus air/fuel ratio for the upper, middle and lower cylinders of one bank of the engine of FIG. 1.

FIG. 7b illustrates that the produced torque also can be optimized in a similar fashion. By selecting the air/fuel ratio for load conditions above the preselected load which maximizes the torque produced by the middle cylinder 30b, the upper and lower cylinders 30a, 30c produce a torque approaching the maximum torque, even though the upper cylinder 30a is supplied with a leaner charge than the lower cylinder 30c.

Between the cylinder banks 28a, 28b, the amount of intake air also is not necessarily the same and likewise often varies, especially under low speed, low load conditions. The upper cylinder 30a of the left cylinder bank 28a may tend to intake more fresh air from the induction system than the upper cylinder 30a of the right cylinder bank 28b because of the differences in lengths in the corresponding intake and exhaust paths. In order to minimize hydrocarbon emissions and maximize engine torque, the air/fuel ratio supplied to each corresponding cylinder 30 in the two cylinder banks 28 can be varied by the fuel injection controller 118.

Figure 8A:
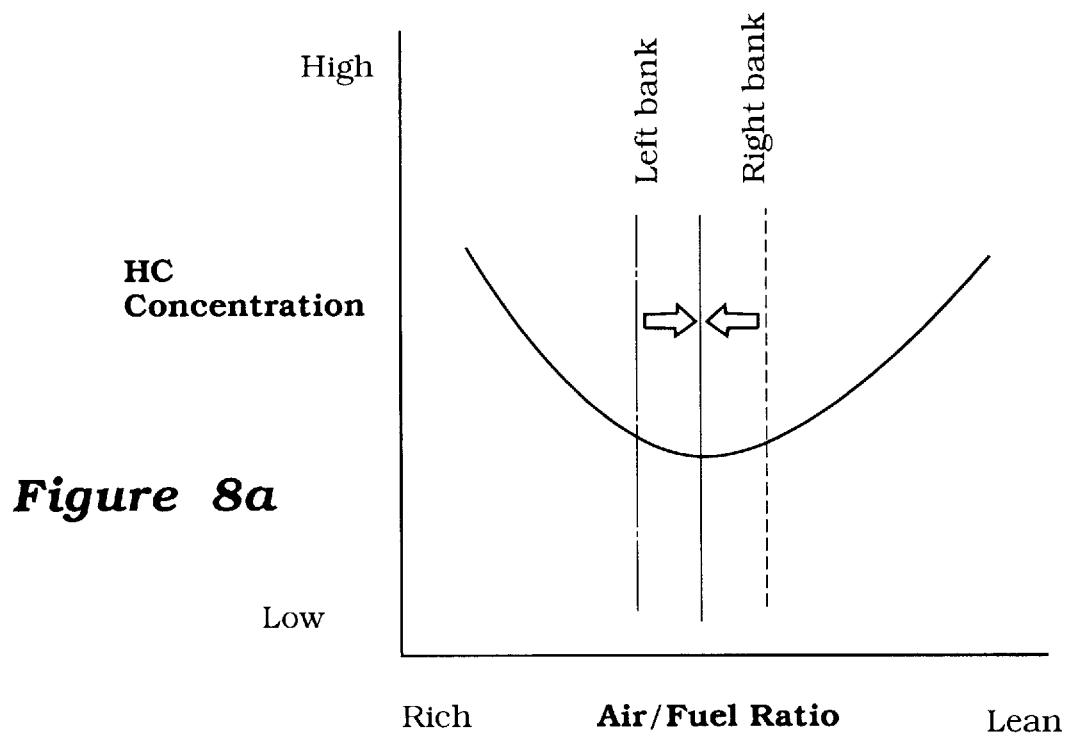
FIG. 8a is a graph of exhaust hydrocarbon concentration versus air/fuel ratio for the first and second cylinder banks of the engine of FIG. 1.
Figure 8B:
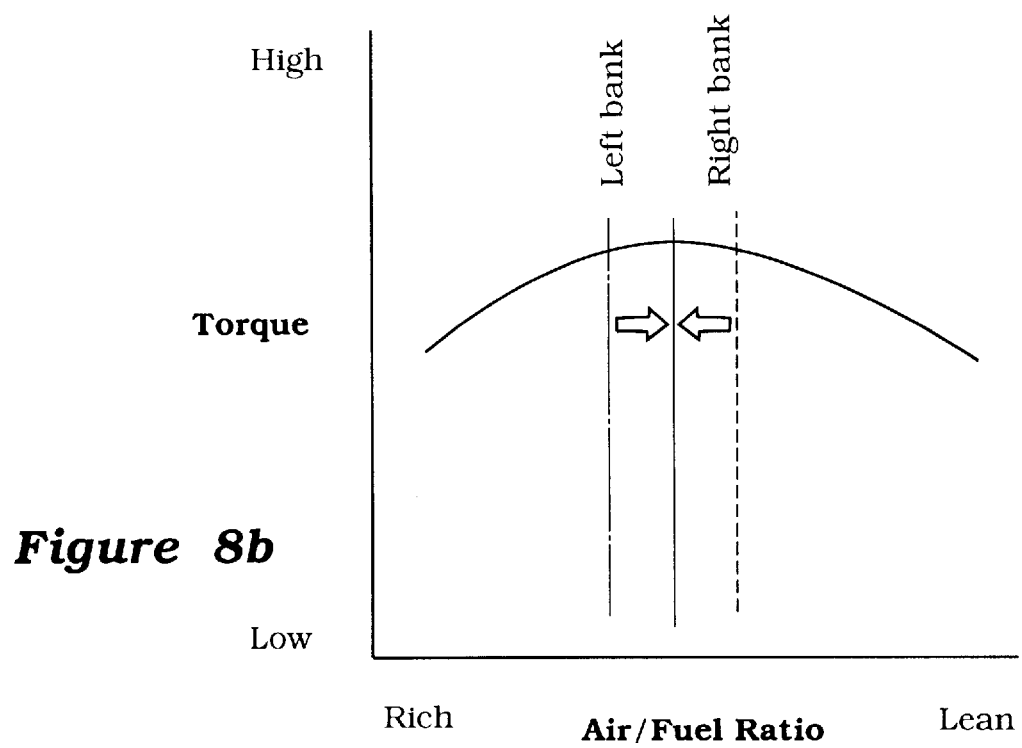
FIG. 8b is a graph of torque versus air/fuel ratio for the first and second cylinder banks of the engine of FIG. 1.

As seen in FIG. 8a, by selecting a respective air/fuel ratio for the corresponding cylinders of the left and right banks 28a, 28b on either side of an optimal mixture, the combine hydrocarbon emission for the banks 28a, 28b is minimized. Likewise, as seen in FIG. 8b, by selecting a respective air/fuel ratio for the corresponding cylinders of the left and right banks 28a, 28b on either side of an optimum mixture, the combined produced torque can be maximized, thereby meeting a targeted torque.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A method of operating an internal combustion engine having at least one bank of variable-volume combustion chambers including at least first, second and third combustion chambers, each combustion chamber being defined by a pair of components which move relative to each other, at least first, second and third fuel injectors each delivering a fuel charge to a respective one of said combustion chambers, and at least first, second and third exhaust paths each communicating with a respective one of the combustion chambers, the first exhaust path having a longer length than the second exhaust path, and the second exhaust path having a longer length than the third exhaust path, said method involving determining the load condition on the engine and comparing the determined load condition against a preselected load condition, and injecting more fuel into the first combustion chamber than into the second combustion chamber and injecting more fuel into the second combustion chamber than into the third combustion chamber when the engine is operating at less than a pre-selected load condition so as to maintain substantially the same fuel/air ratio in each combustion chamber.

2. A method as in claim 1, wherein injecting fuel into the first, second and third combustion chambers involves directly injecting fuel into each of the combustion chambers.

3. A method as in claim 1, wherein injecting more fuel into said first combustion chamber than into said second combustion chamber involves using a longer duration of fuel injection time for the first fuel injector than for the second fuel injector.

4. A method as in claim 1 additionally comprising injecting generally equal amounts of fuel into the first, second and third combustion chambers when the engine is operating at or greater than the pre-selected load condition.

5. A method as in claim 4 additionally comprising determining an amount of fuel required to produce an air/fuel charge of a ratio that maximizes the torque produced by the components of the second combustion chamber for a given load condition when said load condition is equal to or greater than the pre-selected load condition, and injecting the determined amount of fuel into each of the first, second and third combustion chambers.

6. A method as in claim 1, wherein determining the load condition on the engine comprises detecting a throttle angle opening of at least one throttle valve of the engine.

7. A method as in claim 1, wherein determining the load condition on the engine comprises detecting the rotational speed of the engine.

8. A method as in claim 1, wherein determining the load condition on the engine comprises detecting an amount of air delivered to the combustion chambers.

9. A method of operating an internal combustion engine having at least first and second variable-volume combustion chambers, each combustion chamber being defined by a pair of components which move relative to each other, at least first and second fuel injectors each delivering a fuel charge to a respective one of said combustion chambers, and at least first and second fluid paths each communicating with a respective one of the combustion chambers, the first path having a longer length than the second path, said method involving determining the load condition on the engine and comparing the determined load condition against a preselected load condition, injecting more fuel into the first combustion chamber than into the second combustion chamber when the engine is operating at less than a pre-selected load condition to maintain substantially the same fuel/air ratio in each combustion chamber, and injecting generally equal amounts of fuel into the first and second combustion chambers when the engine is operating at or greater than the pre-selected load condition.

10. A method as in claim 9 additionally comprising supplying air to each of the combustion chambers through the respective first and second paths.

11. A method as in claim 9 additionally comprising discharging exhaust gases from each of the combustion chambers through the respective first and second paths.

12. A method as in claim 10, wherein discharging exhaust gases from each of the combustion chambers involves delivering the exhaust gases from the first combustion chamber to a first muffler, and delivering the exhaust gases from the second combustion chamber to a second muffler.

13. A method as in claim 9, wherein injecting fuel into the first and second combustion chambers involves directly injecting fuel into each of the chambers.

14. A method as in claim 9, wherein injecting more fuel into said first combustion chamber than into said second combustion chamber involves using a longer duration of fuel injection time for the first fuel injector than for the second injector.

15. A method as in claim 9, wherein determining the load condition on the engine comprises detecting a throttle angle opening of at least one throttle valve of the engine.

16. A method as in claim 9, wherein determining the load condition on the engine comprises detecting the rotational speed of the engine.

17. A method as in claim 9, wherein determining the load condition on the engine comprises detecting an amount of air delivered to the combustion chambers.

* * * * *